(12) United States Patent
Liu et al.

(10) Patent No.: US 11,493,051 B2
(45) Date of Patent: Nov. 8, 2022

(54) NOISE REDUCTION METHOD OF A VENTILATOR

(71) Applicant: Hunan VentMed Medical Technology Co., Ltd., Shaoyang (CN)

(72) Inventors: Zhe Liu, Shaoyang (CN); Qichang Zheng, Shaoyang (CN); Lei Zhou, Shaoyang (CN); Jinping Su, Shaoyang (CN)

(73) Assignee: Hunan VentMed Medical Technology Co., Ltd., Shaoyang (CN)

( * ) Notice: Subject to any disclaimer, the term of this patent is extended or adjusted under 35 U.S.C. 154(b) by 0 days.

(21) Appl. No.: 17/394,438

(22) Filed: Aug. 5, 2021

(65) Prior Publication Data

US 2022/0120290 A1 Apr. 21, 2022

(30) Foreign Application Priority Data

Oct. 16, 2020 (CN) .......................... 202011108424.1

(51) Int. Cl.
*F04D 27/00* (2006.01)
*F04D 17/12* (2006.01)
(Continued)

(52) U.S. Cl.
CPC ......... *F04D 27/002* (2013.01); *F04D 17/122* (2013.01); *F04D 17/164* (2013.01);
(Continued)

(58) Field of Classification Search
CPC .... F04D 17/164; F04D 27/002; F04D 29/281; F04D 29/664; F04D 29/666; F04D 29/4226
See application file for complete search history.

(56) References Cited

U.S. PATENT DOCUMENTS 4,950,133 A * 8/1990 Sargent ................. F04D 29/664 4/541.5
5,993,158 A * 11/1999 Young ................... F04D 29/305 416/132 R (Continued)

FOREIGN PATENT DOCUMENTS

| CN | 203415227 U | 1/2014 |
|----|-------------|--------|
| CN | 104811559 A | 7/2015 |
| CN | 213136033 U | 5/2021 |

*Primary Examiner* — Sabbir Hasan (57) ABSTRACT

A noise reduction method of a ventilator, comprising the following steps: S1 starting a ventilator and imputing a required wind pressure d at a man-machine interface, and then sending a signal to an actuator through a processor, and adjusting a first blade automatically to a maximum adjustable angle state $a'^{\circ}$ through the actuator and a second blade to a minimum adjustable angle state $b^{\circ}$; S2 regulating a revolution speed, when a wind pressure is d, feeding back a revolution speed c, a conducting noise $e_1$ and a radiated noise $f_1$ to the processor through an acquisition device, and after the processor receives a revolution speed information, sending a command to lock the revolution speed to the actuator through the processor. The present disclosure can effectively solve the poor noise reduction function of the present noise reduction hoop, and can effectively reduce the cost and simplify the installation process.

6 Claims, 5 Drawing Sheets

(51) Int. Cl.
*F04D 17/16* (2006.01)
*F04D 29/28* (2006.01)
*F04D 29/42* (2006.01)
*F04D 29/66* (2006.01)

(52) U.S. Cl.
CPC ....... *F04D 29/281* (2013.01); *F04D 29/4226* (2013.01); *F04D 29/661* (2013.01); *F04D 29/662* (2013.01); *F04D 29/664* (2013.01); *F04D 29/666* (2013.01)

(56) References Cited

U.S. PATENT DOCUMENTS

| | | | | |
|---|---|---|---|---|
| 7,841,831 B2* | 11/2010 | Chen | ........................ | B63H 3/00 |
| | | | | 416/116 |
| 8,267,648 B2* | 9/2012 | Kenyon | ................ | F04D 17/164 |
| | | | | 415/206 |
| 8,342,822 B2* | 1/2013 | Thoms | .................... | A61M 1/80 |
| | | | | 494/84 |
| 9,206,808 B2* | 12/2015 | Yuan | ........................ | F04D 17/16 |
| 2020/0080567 A1* | 3/2020 | Lewandowski | ....... | F04D 29/281 |

* cited by examiner

NOISE REDUCTION METHOD OF A VENTILATOR

CROSS-REFERENCE TO RELATED APPLICATIONS

The application claims priority to Chinese patent application No. 202011108424.1, filed on Oct. 16, 2020, the entire contents of which are incorporated herein by reference.

TECHNICAL FIELD

The present disclosure relates to a noise reduction device, in particularly relates to a noise reduction method of a ventilator and a noise reduction hoop device.

BACKGROUND

As a device with artificial ventilation function, the ventilator has been widely used in the treatment of various causes of respiratory failure, like sleep apnea hypopnea syndrome and other diseases, and it occupies a very important position in the field of modern medicine. In the field of non-invasive ventilators, as people pay more attention to respiratory therapy, the performance requirements of ventilators have become higher. Two indicators that users can easily perceive are a radiated noise and a conducted noise. These two indicators (the radiated noise and the conducted noise) directly affect whether the user can fall asleep, especially when the ventilator is just used, and the two indicators can be used as a basis for judging whether the user is willing to receive a non-invasive and non-respiratory treatment for a long time.

The noise source of a non-invasive ventilator is mainly a blower device. In view of the existing problems in the prior art, it is urgent to provide a ventilator that can reduce the noise of a blast blower.

SUMMARY

A noise reduction method of a ventilator, comprising the following steps:

S1: starting a ventilator and imputing a required wind pressure d at a man-machine interface, and then sending a signal to an actuator through a processor, and adjusting a first blade automatically to a maximum adjustable angle state $a'^\circ$ through the actuator and a second blade to a minimum adjustable angle state $b^\circ$;

S2: regulating a revolution speed, when a wind pressure is d, feeding back a revolution speed c, a conducting noise $e_1$ and a radiated noise $f_1$ to the processor through an acquisition device, and after the processor receives a revolution speed information, sending a command to lock the revolution speed to the actuator through the processor, and sending the command simultaneously to adjust an angle of the first blade and an angle of the second blade through the processor;

S3: adjusting the second blade to $b^\circ+1^\circ$, detecting a change in the wind pressure through a wind pressure acquisition device and feeding the change back to the processor, and then sending the command through the processor to continuously turn down the angle of the first blade until monitoring the wind pressure as d by an air outlet and sending a signal to the processor, and then sending the command through the processor to collect a real-time conducting noise $e_2$ and a real-time radiated noise $f_2$ and feeding the real-time conducting noise $e_2$ and the real-time radiated noise $f_2$ back to the processor and sending the command simultaneously to adjust the angle of the second blade; or if the angle of the first blade reaches $a^\circ$ and a wind pressure d is not detected, sending the command directly through the processor to adjust the angle of the second blade;

S4: adjusting the second blade to $b^\circ+2^\circ$, detecting the change in the wind pressure through the wind pressure acquisition device and feeding the change back to the processor, and sending the command through the processor to continuously turn down the angle of the first blade, and monitoring the wind pressure as d by the air outlet, collecting a real-time conducting noise $e_3$ and a real-time radiated noise $f_3$ through a sensor and feeding the real-time conducting noise $e_3$ and the real-time radiated noise $f_3$ back to the processor and sending the command simultaneously through the processor to adjust the angle of the second blade; or if the angle of the first blade reaches $a^\circ$ and the wind pressure d is not detected, sending the command directly through the processor to adjust the angle of the second blade;

S5: continuing above steps until the second blade is adjusted to $b'^\circ$, detecting the change in the wind pressure through the wind pressure acquisition device and feeding the change back to the processor, and sending the command through the processor to continuously turn down the angle of the first blade, and monitoring the wind pressure as d by the air outlet, collecting the real-time conducting noise $e_3$ and the real-time radiated noise $f_3$ through the sensor and feeding the real-time conducting noise $e_3$ and the real-time radiated noise $f_3$ back to the processor; if the angle of the first blade reaches $a^\circ$, but a wind pressure e is not detected, and then importing all e values and f values through the processor into a formula $ek_1+fk_2=y$, and then comparing obtained $y_1, y_2, y_3 \ldots$ to $y_n$ to obtain $y_{min}$, and extracting a first blade angle $a_{min}$, a second blade angle $b_{min}$, a conducting noise $e_{min}$, a radiated noise $f_{min}$, the revolution speed c and the wind pressure d corresponding to $y_{min}$ to an interactive interface to archive.

The present disclosure discloses a noise reduction device based on the noise reduction method of a ventilator, and a noise reduction hoop and a blower device of the ventilator is integrated, the blower device is connected with a ventilator body, and the noise reduction hoop includes a first top hood and a second top hood;

the first top hood and the second top hood are fixedly connected to form a first annular cavity, and an upper part of the first top hood and the second top hood has an air inlet, and a lower part of the first top hood and the second top hood has a second air outlet, and the second air outlet is equipped with a first audio acquisition device, and the first audio acquisition is connected with the processor;

the first top hood and the second top hood are respectively fixedly connected with a bottom hood of the blower device, forming a second annular cavity between the first top hood and the second top hood and the bottom hood respectively; and the bottom hood is equipped with a vent, and the vent is equipped with a wind pressure monitoring device and a second audio acquisition device, and the wind pressure monitoring device and the second audio acquisition device are connected with the processor;

the first annular cavity and the second annular cavity are provided with a double-layer impeller, the double-layer impeller comprises a connecting rod, and a top impeller and a bottom impeller fixed at both ends of the connecting rod, and an edge of the top impeller and inner walls of the first top hood and the second top hood have a first air outlet;

the connecting rod is fixed on an output shaft of a driving motor, the driving motor is connected with a control module, and the control module which is connected with the processor is located on the top impeller in the first annular cavity to fix multiple first blades by an angle adjustment device, and the control module is located on the bottom impeller in the second annular cavity to fix multiple second blades by the angle adjustment device.

Further:

preferably, inner walls of the first annular cavity and the second annular cavity are equipped with a pugging.

Preferably, the area ratio between the air inlet, the first air outlet and the second air outlet is 1:2.

Preferably, a height of the first blade and the second blade gradually decreases from a center to an edge of the double-layer impeller.

Preferably, the top impeller divides the first annular cavity into a first air chamber and a second air chamber.

Preferably, there are 7 first blades.

Preferably, there are at least 3 or 5 second blades.

Preferably, a dimension of the second blade is larger than a dimension of the first blade.

Compared with the prior art, the present disclosure has the following beneficial effects:

1. The number of first blades on the top impeller is large, and the installation angle of the first blades is small, so that the noise generated when the top impeller rotates is small.

2. The number of second blades on the bottom impeller is small, and the installation angle of the second blades is large, so that the second blades can effectively increase the wind pressure and air volume. Meanwhile, the noise generated by the second blade will be blocked by the bottom hoop, the bottom walls of the first top hood, the bottom wall of the second top hood and the second air chamber.

3. The noise reduction hoop and the blower device of the ventilator is integrated, and it is no need to install additional noise reduction hoop. The integration can achieve noise reduction while effectively reducing the cost, and can also simplify the process of installing the noise reduction hoop so as to improve the assembly efficiency.

4. A first annular cavity is formed between the first top hood and the second top hood 9, and then air enters the first annular cavity and is accelerated for the first time by the impeller in the first annular cavity, and the first annular cavity can pre-accelerate the air, and can block the noise generated by the second annular cavity.

5. A second annular cavity is formed between the first top hood and the second top hood and the bottom hoop 5 respectively. The air passing through the first annular cavity flows through the first air outlet and then enters the second annular cavity. The second annular cavity can accelerate the air twice, and the noise generated by the second acceleration will be blocked by the first cavity and the bottom hoop.

6. The first annular cavity and the second annular cavity are provided with a double-layer impeller, and the double-layer impeller can simultaneously accelerate the air in the first annular cavity and the second annular cavity.

7. The first blade and the second blade can accelerate the air. Setting the parameters of the first blade and the second blade will obtain sufficient wind pressure and air volume while reducing the noise.

8. The area ratio between the air inlet 3, the first top hood 1 and the second air outlet 10 is 1:2. The approximate area ratio can effectively avoid the bottleneck effect caused by the excessive pressure difference between the front and rear air or the noise caused by the collision of air with object, the blade and the impeller under the pressure.

9. The top impeller divides the first annular cavity into a first air chamber and a second air chamber. The second air chamber is located between the top impeller and the bottom impeller to play a transitional role, and can separate the double-layer impeller. The second air chamber can avoid interference between the double-layer impellers when they are adjacent to each other and noise caused by air collision.

DETAILED DESCRIPTION OF THE EMBODIMENTS

Figure 1:
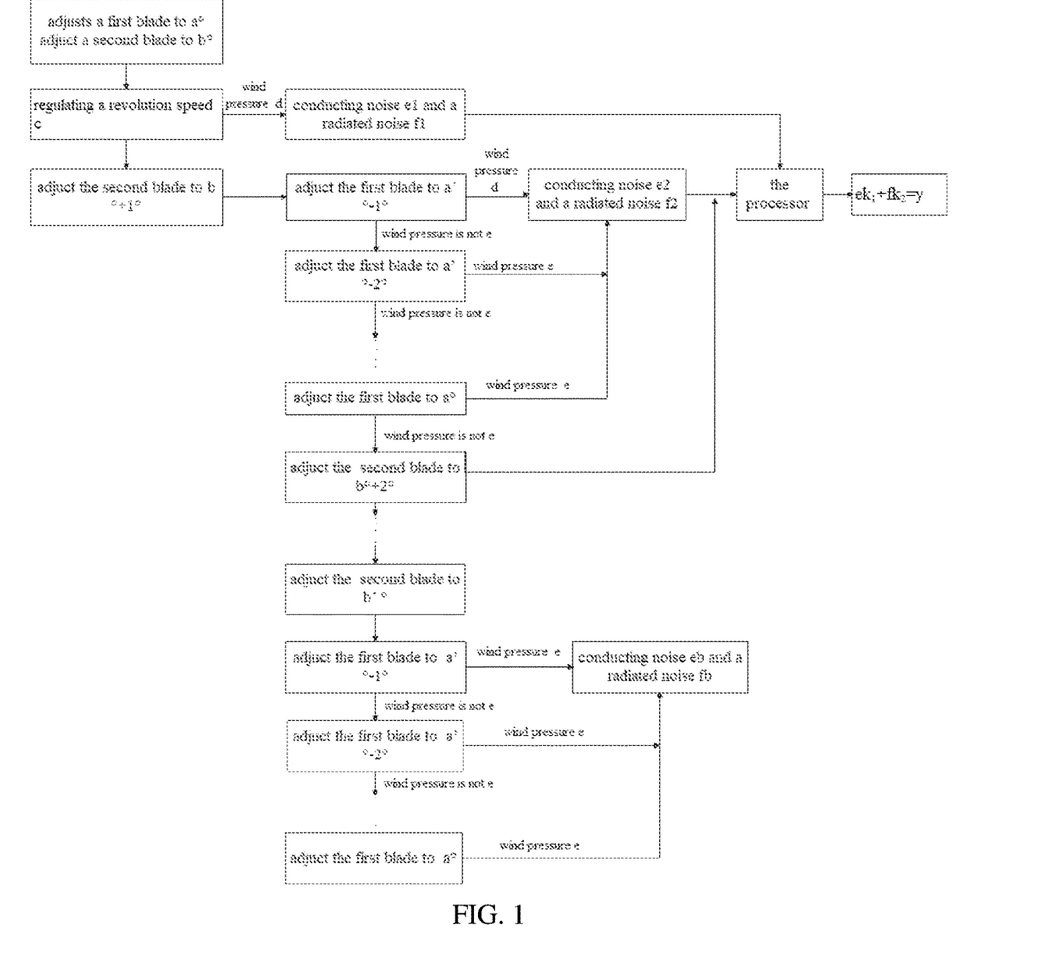
FIG. 1 is a flow chart of the noise reduction method of the present disclosure.
Figure 2:
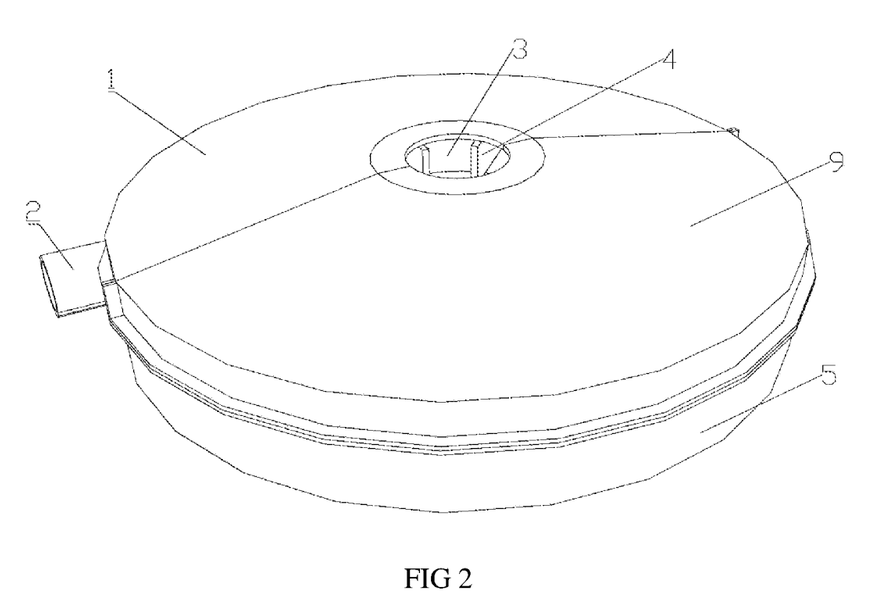
FIG. 2 is an overall structure diagram of the present disclosure.
Figure 3:
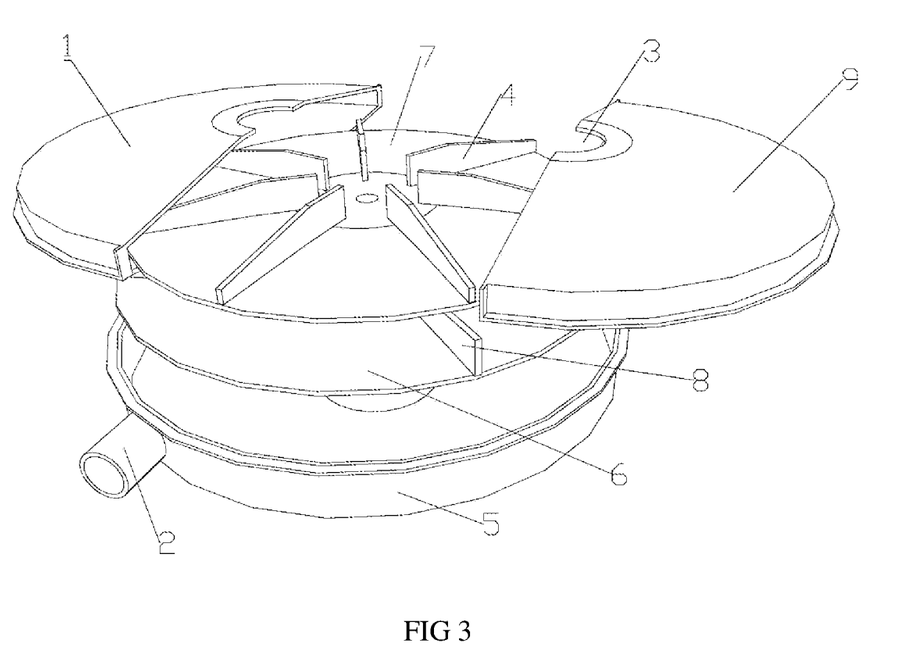
FIG. 3 is an exploded structure diagram of the present disclosure.
Figure 4:
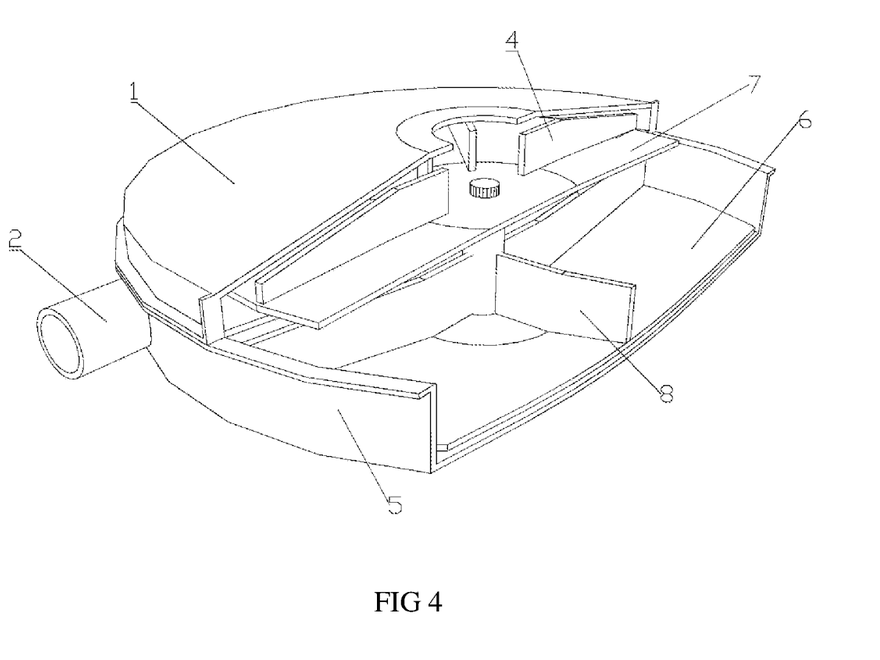
FIG. 4 is a partial perspective image of the present disclosure.
Figure 5:
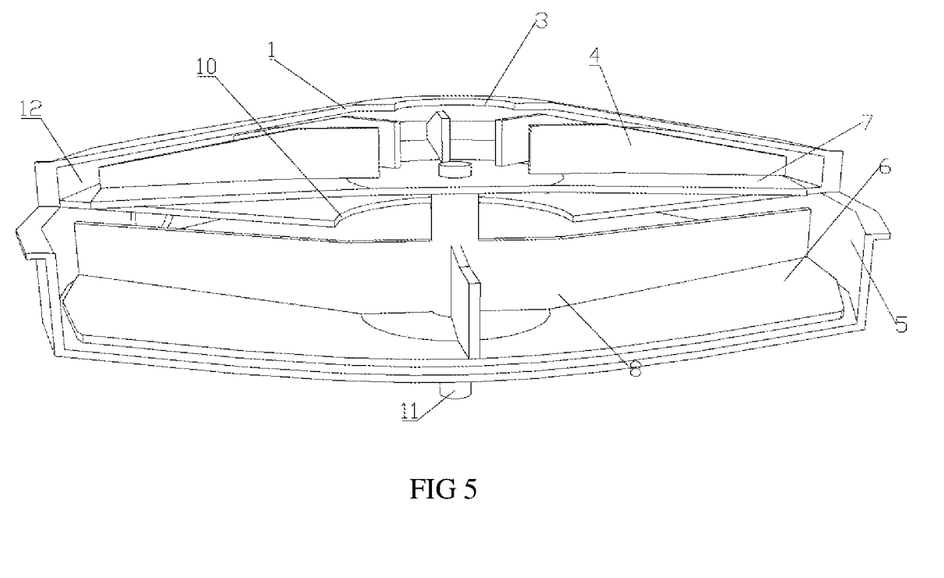
FIG. 5 is a main view of FIG. 4.

FIG. 1: the noise reduction method of a ventilator, comprising the following steps:

S1: starting a ventilator and imputing a required wind pressure d at a man-machine interface, and then sending a signal to an actuator through a processor, and adjusting a first blade automatically to a maximum adjustable angle state $a'^{\circ}$ through the actuator and a second blade to a minimum adjustable angle state $b^{\circ}$.

S2: regulating a revolution speed, when a wind pressure is d, feeding back a revolution speed c, a conducting noise $e_1$ and a radiated noise $f_1$ to the processor through an acquisition device, and after the processor receives a revolution speed information, sending a command to lock the revolution speed to the actuator through the processor, and sending the command simultaneously to adjust an angle of the first blade and an angle of the second blade through the processor.

S3: adjusting the second blade to $b^{\circ}+1^{\circ}$, detecting a change in the wind pressure through a wind pressure acquisition device and feeding the change back to the processor, and then sending the command through the processor to continuously turn down the angle of the first blade until monitoring the wind pressure as d by an air outlet and sending a signal to the processor, and then sending the command through the processor to collect a real-time conducting noise $e_2$ and a real-time radiated noise $f_2$ and feeding the real-time conducting noise $e_2$ and the real-time radiated noise $f_2$ back to the processor and sending the command simultaneously to adjust the angle of the second blade; or if the angle of the first blade reaches $a^{\circ}$ and a wind pressure d is not detected, sending the command directly through the processor to adjust the angle of the second blade.

S4: adjusting the second blade to $b^{\circ}+2^{\circ}$, detecting the change in the wind pressure through a wind pressure acquisition device and feeding the change back to the processor, and sending the command through the processor to continuously turn down the angle of the first blade, and monitoring the wind pressure as d by the air outlet, collecting a real-time conducting noise $e_3$ and a real-time radiated noise $f_3$ through a sensor and feeding the real-time conducting noise $e_3$ and the real-time radiated noise $f_3$ back to the processor and sending the command simultaneously through the processor to adjust the angle of the second blade; or if the angle of the first blade reaches $a^{\circ}$ and the wind pressure d is not detected, sending the command directly through the processor to adjust the angle of the second blade.

S5: continuing above steps until the second blade is adjusted to $b^{t\circ}$, detecting the change in the wind pressure through the wind pressure acquisition device and feeding the change back to the processor, and sending the command through the processor to continuously turn down the angle of the first blade, and monitoring the wind pressure as d by the air outlet, collecting the real-time conducting noise $e_3$ and the real-time radiated noise $f_3$ through the sensor and feeding the real-time conducting noise $e_3$ and the real-time radiated noise $f_3$ back to the processor; if the angle of the first blade reaches $a°$, but a wind pressure e is not detected, and then importing all e values and f values through the processor into a formula $ek_1+fk_2=y$, and then comparing obtained $y_1, y_2, y_3 \ldots$ to $y_n$ to obtain $y_{min}$, and extracting a first blade angle $a_{min}$, a second blade angle $b_{min}$, a conducting noise $e_{min}$, a radiated noise $f_{min}$, the revolution speed c and the wind pressure d corresponding to $y_{min}$ to an interactive interface to archive.

FIGS. 2-5: the present disclosure discloses a noise reduction device based on the noise reduction method of a ventilator, and the noise reduction hoop for the ventilator and the ventilator with the noise reduction hoop, a noise reduction hoop and a blower device of the ventilator is integrated, and it is no need to install additional noise reduction hoop. The integration can achieve noise reduction while effectively reducing the cost, and can also simplify the process of installing the noise reduction hoop so as to improve the assembly efficiency. The blower device is connected with the ventilator, and the noise reduction hoop includes the first top hood 1 and the second top hood 9.

The first top hood 1 and the second top hood 9 are fixedly connected. The first annular cavity is formed between the first top hood and the second top hood 9, and then air enters the first annular cavity and is accelerated for the first time by the impeller in the first annular cavity, and the first annular cavity can pre-accelerate the air, and can block the noise generated by the second annular cavity. The upper part of the first top hood 1 and the second top hood 9 has an air inlet 3, and the lower part of the first top hood 1 and the second top hood 9 has a second air outlet 10, and the second air outlet 10 is equipped with first audio acquisition device, and the first audio acquisition is connected with the processor.

The first top hood 1 and the second top hood 9 are respectively fixedly connected with the bottom hood 5 of the blower device, forming a second annular cavity between the first top hood 1 and the second top hood 9 and the bottom hood 5 respectively. The air passing through the first annular cavity flows through the first air outlet, and then enters the second annular cavity, which can accelerate the air a second time, and the noise generated by the secondary acceleration will be blocked by the first cavity and the bottom hood. The bottom hood 5 is equipped with a vent 2, and the vent 2 is equipped with a wind pressure monitoring device and a second audio acquisition device, and the wind pressure monitoring device and the second audio acquisition device are connected with the processor.

The first annular cavity and the second annular cavity are provided with a double-layer impeller, which can accelerate the air in the first annular cavity and the second annular cavity. The double-layer impeller comprises a connecting rod, and a top impeller and a top impeller 76 fixed at both ends of the connecting rod, and an edge of the top impeller and inner walls of the first top hood 1 and the second top hood 9 have a first air outlet 12.

The connecting rod is fixed on an output shaft 11 of a driving motor, the driving motor is connected with a control module, and the control module which is connected with the processor is located on the top impeller in the first annular cavity to fix multiple first blades 4 by an angle adjustment device, and the control module is located on the top impeller 76 in the second annular cavity to fix multiple second blades 8 by the angle adjustment device. The first blade and the second blade can accelerate the air. Setting the parameters of the first blade and the second blade will obtain sufficient wind pressure and air volume while reducing the noise.

The inner walls of the first annular cavity and the second annular cavity are both provided with a pugging which can block noise.

The area ratio between the air inlet 3, the first top hood 1 and the second air outlet 10 is 1:2. The approximate area ratio can effectively avoid the bottleneck effect caused by the excessive pressure difference between the front and rear air or the noise caused by the collision of air with object, the blade and the impeller under the pressure.

The height of the first blade 4 and the second blade 8 gradually decreases from a center to an edge of the double-layer impeller.

The top impeller divides the first annular cavity into a first air chamber and a second air chamber. The second air chamber is located between the top impeller and the bottom impeller to play a transitional role, and can separate the double-layer impeller. The second air chamber can avoid interference between the double-layer impellers when they are adjacent to each other and noise caused by air collision.

There are 7 first blades 4, because at a certain speed, the more number of blades, the more the noise generated by the blades can be reduced.

There are at least 3 or 5 second blades 8, because at a certain speed, the smaller the number of blades, the greater the air volume and wind pressure can be obtained. The second blade is located in the second annular cavity, and since the number of blades is small, the noise generated will be blocked by the bottom hoop and the first annular cavity.

The dimension of the second blade 8 is larger than the dimension of the first blade 4. At the same speed, the blade size is larger, the wind pressure and air volume generated are larger, and the smaller the blade size, the lower the noise Smaller blades are arranged in the first annular cavity, which can effectively reduce the noise generated by the blower device. Larger blades are arranged in the second annular cavity to ensure greater air volume and wind pressure, and the noise generated by the larger blades is blocked by the bottom hoop and the first annular cavity.

The above-mentioned embodiments are only preferred embodiments of the present disclosure, and cannot be used to limit the right scope of the present disclosure. And any modifications, equivalent changes, improvements, etc. made according to the scope of the present disclosure still belong to the protection scope of the present disclosure.

What is claimed is:

1. A noise reduction device for a ventilator, wherein:
   a noise reduction hoop and a blower device of the ventilator is integrated, the blower device is connected with a ventilator body, and the noise reduction hoop includes a first top hood and a second top hood;
   the first top hood and the second top hood are fixedly connected to form a first annular cavity, and an upper part of the first top hood and the second top hood has an air inlet, and a lower part of the first top hood and the second top hood has a second air outlet;
   the first top hood and the second top hood are respectively fixedly connected with a bottom hood of the blower device, forming a second annular cavity between the first top hood and the second top hood and the bottom hood respectively; wherein the bottom hood is equipped with a vent, inner walls of the first annular cavity and the second annular cavity are equipped with a pugging;

an area ratio between the air inlet 3, and the second air outlet is 1:2;

the first annular cavity and the second annular cavity are provided with a double-layer impeller, wherein the double-layer impeller comprises a connecting rod, a top impeller and a bottom impeller fixed at both ends of the connecting rod, and an edge of the top impeller and inner walls of the first top hoop and the second top hoop have a first air outlet, and the double-layer impeller is configured to accelerate air in the first annular cavity and the second annular cavity, and wherein the connecting rod is fixed on an output shaft of a driving motor.

2. The noise reduction device for the ventilator according to claim 1, wherein: a height of a first blade and a second blade gradually decreases from a center to an edge of the double-layer impeller.

3. The noise reduction device for the ventilator according to claim 1, wherein: the top impeller divides the first annular cavity into a first air chamber and a second air chamber.

4. The noise reduction device for the ventilator according to claim 1, wherein: there are 7 first blades.

5. The noise reduction device for the ventilator according to claim 1, wherein: there are at least 3 or 5 second blades.

6. The noise reduction device for the ventilator according to claim 1, wherein: a dimension of a second blade is larger than a dimension of a first blade.

* * * * *